United States Patent
Palmer et al.

(10) Patent No.: US 11,809,311 B2
(45) Date of Patent: Nov. 7, 2023

(54) HOST-BASED FLASH MEMORY MAINTENANCE TECHNIQUES

(71) Applicant: Micron Technology, Inc., Boise, ID (US)

(72) Inventors: David Aaron Palmer, Boise, ID (US); Christian M. Gyllenskog, Meridian, ID (US); Jonathan Scott Parry, Boise, ID (US); Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/397,393

(22) Filed: Aug. 9, 2021

(65) Prior Publication Data

US 2021/0365364 A1    Nov. 25, 2021

Related U.S. Application Data

(63) Continuation of application No. 16/230,313, filed on Dec. 21, 2018, now Pat. No. 11,226,894.

(51) Int. Cl.
*G06F 12/02* (2006.01)
*G06F 3/06* (2006.01)

(52) U.S. Cl.
CPC ........ *G06F 12/0246* (2013.01); *G06F 3/0629* (2013.01); *G06F 12/0253* (2013.01); *G06F 12/0292* (2013.01)

(58) Field of Classification Search
CPC .............. G06F 12/0246; G06F 3/0629; G06F 12/0292; G06F 12/0253
See application file for complete search history.

(56) References Cited

U.S. PATENT DOCUMENTS

| | | | |
|---|---|---|---|
| 5,812,861 A | 9/1998 | Ishac et al. |
| 6,009,528 A | 12/1999 | Teraoka |
| 6,345,347 B1 | 2/2002 | Biran |
| 8,161,353 B2 | 4/2012 | Flynn et al. |
| 8,539,148 B1 | 9/2013 | Ku et al. |
| 9,229,853 B2 | 1/2016 | Khan et al. |
| 9,336,412 B2 | 5/2016 | Choi et al. |
| 9,407,642 B2 | 8/2016 | Korkishko et al. |
| 9,489,317 B2 | 11/2016 | Sauer |

(Continued)

FOREIGN PATENT DOCUMENTS

| | | |
|---|---|---|
| CN | 103136116 A | 6/2013 |
| CN | 104885062 A | 9/2015 |

(Continued)

OTHER PUBLICATIONS

"Korean Application Serial No. 10-2021-7008127, Notice of Preliminary Rejection dated Jul. 30, 2021", w/ English translation, 6 pgs.

(Continued)

*Primary Examiner* — Mark A Giardino, Jr.
(74) *Attorney, Agent, or Firm* — Schwegman Lundberg & Woessner, P.A.

(57) ABSTRACT

Devices and techniques are disclosed herein for allowing host-based maintenance of a flash memory device. In certain examples, memory write information can be encrypted at the memory device and provided to the host for updating and maintaining memory device maintenance statistics.

20 Claims, 7 Drawing Sheets

(56) References Cited

U.S. PATENT DOCUMENTS

| | | | |
|---|---|---|---|
| 9,519,578 | B1 | 12/2016 | Kuzmin et al. |
| 9,645,757 | B2 | 5/2017 | Chinnakkonda Vidyapoornachary et al. |
| 9,672,384 | B2 | 6/2017 | Goto et al. |
| 9,749,319 | B2 | 8/2017 | Serebrin |
| 9,785,369 | B1 | 10/2017 | Ateniese et al. |
| 9,804,976 | B1 | 10/2017 | Stark et al. |
| 9,823,872 | B2 | 11/2017 | Danilak et al. |
| 9,898,404 | B2 | 2/2018 | Huang et al. |
| 10,424,388 | B2 | 9/2019 | Oh et al. |
| 10,459,845 | B1 | 10/2019 | Cariello |
| 10,489,289 | B1 | 11/2019 | Peterson et al. |
| 10,510,419 | B1 | 12/2019 | Yamada et al. |
| 10,803,957 | B2 | 10/2020 | Yamada et al. |
| 10,852,964 | B2 | 12/2020 | Grosz |
| 10,923,202 | B2 | 2/2021 | Palmer |
| 11,036,625 | B1 | 6/2021 | Balluchi et al. |
| 11,226,894 | B2 | 1/2022 | Palmer et al. |
| 11,226,907 | B2 | 1/2022 | Palmer |
| 11,263,124 | B2 | 3/2022 | Palmer |
| 2002/0112178 | A1 | 8/2002 | Scherr |
| 2006/0056264 | A1 | 3/2006 | Worley et al. |
| 2006/0294299 | A1 | 12/2006 | Edirisooriya |
| 2008/0059752 | A1 | 3/2008 | Serizawa |
| 2008/0082736 | A1 | 4/2008 | Chow et al. |
| 2008/0082773 | A1 | 4/2008 | Tomlin et al. |
| 2008/0189485 | A1 | 8/2008 | Jung et al. |
| 2008/0288785 | A1 | 11/2008 | Rao et al. |
| 2009/0094463 | A1 | 4/2009 | Boucher et al. |
| 2010/0082890 | A1 | 4/2010 | Heo et al. |
| 2010/0161887 | A1 | 6/2010 | Nakazumi |
| 2010/0262765 | A1 | 10/2010 | Cheon et al. |
| 2011/0019486 | A1 | 1/2011 | Jang et al. |
| 2011/0082967 | A1 | 4/2011 | Deshkar et al. |
| 2012/0246442 | A1 | 9/2012 | Dolgunov et al. |
| 2013/0145106 | A1 | 6/2013 | Kan |
| 2013/0159766 | A1 | 6/2013 | D'Abreu et al. |
| 2013/0166822 | A1 | 6/2013 | Franceschini et al. |
| 2013/0179647 | A1 | 7/2013 | Park et al. |
| 2013/0269039 | A1 | 10/2013 | Gold et al. |
| 2013/0326121 | A1 | 12/2013 | Cheng |
| 2014/0019701 | A1 | 1/2014 | Ohira et al. |
| 2014/0129761 | A1* | 5/2014 | Kwon .................. G06F 12/0246 711/103 |
| 2014/0164677 | A1 | 6/2014 | Borchers et al. |
| 2014/0325013 | A1 | 10/2014 | Tamir et al. |
| 2014/0365719 | A1 | 12/2014 | Kuzmin et al. |
| 2015/0178224 | A1 | 6/2015 | Seo et al. |
| 2015/0206584 | A1 | 7/2015 | Tsai et al. |
| 2015/0293858 | A1 | 10/2015 | Raam |
| 2016/0085696 | A1 | 3/2016 | Chiu et al. |
| 2016/0197722 | A1 | 7/2016 | Mothilal |
| 2016/0217089 | A1 | 7/2016 | Hsu et al. |
| 2016/0266818 | A1 | 9/2016 | Lin et al. |
| 2017/0093823 | A1* | 3/2017 | Gopal .................. H04L 63/061 |
| 2017/0109089 | A1 | 4/2017 | Huang |
| 2017/0177497 | A1 | 6/2017 | Chun et al. |
| 2017/0192902 | A1 | 7/2017 | Hwang et al. |
| 2018/0060607 | A1 | 3/2018 | Tasher et al. |
| 2018/0113631 | A1 | 4/2018 | Zhang et al. |
| 2018/0181328 | A1 | 6/2018 | Espeseth et al. |
| 2018/0324181 | A1 | 11/2018 | Serebrin |
| 2019/0004944 | A1 | 1/2019 | Widder et al. |
| 2019/0121576 | A1 | 4/2019 | Jean |
| 2019/0129838 | A1* | 5/2019 | Yoshida .................. G06F 12/10 |
| 2019/0258567 | A1 | 8/2019 | Kim et al. |
| 2019/0287632 | A1 | 9/2019 | Asano et al. |
| 2020/0004694 | A1 | 1/2020 | Szubbocsev et al. |
| 2020/0005876 | A1 | 1/2020 | Yamada |
| 2020/0042436 | A1 | 2/2020 | Palmer |
| 2020/0043561 | A1 | 2/2020 | Palmer |
| 2020/0097194 | A1 | 3/2020 | Grosz |
| 2020/0118634 | A1 | 4/2020 | Yamada |
| 2020/0142631 | A1* | 5/2020 | Song .................. G06F 12/0246 |
| 2020/0143040 | A1* | 5/2020 | Sutton .................. G06F 3/067 |
| 2020/0201752 | A1 | 6/2020 | Palmer |
| 2020/0201784 | A1 | 6/2020 | Palmer |
| 2022/0179783 | A1 | 6/2022 | Palmer |
| 2022/0206959 | A1 | 6/2022 | Palmer |

FOREIGN PATENT DOCUMENTS

| | | | |
|---|---|---|---|
| CN | 107015920 | A | 8/2017 |
| CN | 107438850 | A | 12/2017 |
| CN | 110175138 | A | 8/2019 |
| CN | 112673357 | A | 4/2021 |
| CN | 112771491 | A | 5/2021 |
| CN | 113196245 | A | 7/2021 |
| CN | 113439264 | A | 9/2021 |
| CN | 112771491 | B | 4/2022 |
| CN | 114579476 | A | 6/2022 |
| JP | 2003280989 | | 10/2003 |
| JP | 2005322201 | A | 11/2005 |
| JP | 2013191174 | A | 9/2013 |
| JP | 2017519269 | A | 7/2017 |
| JP | 2017162067 | A | 9/2017 |
| KR | 20140057454 | | 5/2014 |
| KR | 20150126232 | A | 11/2015 |
| KR | 20160021957 | A | 2/2016 |
| KR | 20170081118 | A | 7/2017 |
| KR | 20170125698 | A | 11/2017 |
| KR | 102377365 | B1 | 3/2022 |
| KR | 102437704 | B1 | 8/2022 |
| TW | 201333963 | A | 8/2013 |
| TW | 201514697 | A | 4/2015 |
| TW | I641966 | B | 11/2018 |
| TW | 202038086 | A | 10/2020 |
| TW | 202141267 | A | 11/2021 |
| WO | WO-2005015818 | A1 | 2/2005 |
| WO | WO-2020028804 | A1 | 2/2020 |
| WO | WO-2020068669 | A1 | 4/2020 |
| WO | WO-2020131913 | A1 | 6/2020 |
| WO | WO-2020132274 | A1 | 6/2020 |

OTHER PUBLICATIONS

"Korean Application Serial No. 10-2021-7017849, Office Action dated Oct. 18, 2021", w/English translation, 5 pgs.

"Korean Application Serial No. 10-2021-7008127, Notice of Preliminary Rejection dated Dec. 21, 2021", w English translation, 5 pgs.

"Chinese Application Serial No. 201980062579.5, Response Filed Dec. 16, 2021 to Office Action dated Aug. 2, 2021", W English Claims, 66 pgs.

"Chinese Application Serial No. 201980059061.6, Voluntary Amendment Filed Aug. 5, 2021", w English Claims, 22 pgs.

"Korean Application Serial No. 10-2021-7008127, Response filed Sep. 29, 2021 to Notice of Preliminary Rejection dated Jul. 30, 2021", w English Claims, 16 pgs.

"European Application Serial No. 19898012.0, Response to Communication pursuant to Rules 161 (2) and 162 EPC dated Feb. 15, 2022", W English Claims, 12 pgs.

Host-Resident Translation Layer Validity Check, U.S. Appl. No. 16/054,072, Notice of Allowance dated Nov. 3, 2021, 9 pgs.

Host-Resident Translation Layer Validity Check Techniques, U.S. Appl. No. 16/226,078, Notice of Allowance dated Sep. 22, 2021, 7 pgs.

Host-Based Flash Memory Maintenance Techniques, U.S. Appl. No. 16/230,313, Notice of Allowance dated Sep. 13, 2021, 5 pgs.

"International Application Serial No. PCT/US2019/044909, International Preliminary Report on Patentability dated Feb. 18, 2021", 8 pgs.

"International Application Serial No. PCT/US2019/044909, International Search Report dated Nov. 15, 2019", 4 pgs.

"International Application Serial No. PCT/US2019/044909, Written Opinion dated Nov. 15, 2019", 4 pgs.

"International Application Serial No. PCT/US2019/052435, International Preliminary Report on Patentability dated Apr. 8, 2021", 8 pgs.

(56) References Cited

OTHER PUBLICATIONS

"International Application Serial No. PCT/US2019/052435, International Search Report dated Jan. 13, 2020", 4 pgs.
"International Application Serial No. PCT/US2019/052435, Written Opinion dated Jan. 13, 2020", 5 pgs.
"International Application Serial No. PCT/US2019/066914, International Preliminary Report on Patentability dated Jul. 1, 2021", 6 pgs.
"International Application Serial No. PCT/US2019/066914, International Search Report dated Apr. 20, 2020", 3 pgs.
"International Application Serial No. PCT/US2019/066914, Written Opinion dated Apr. 20, 2020", 4 pgs.
"International Application Serial No. PCT/US2019/067531, International Preliminary Report on Patentability dated Jul. 1, 2021", 8 pgs.
"International Application Serial No. PCT/US2019/067531, International Search Report dated May 1, 2020", 3 pgs.
"International Application Serial No. PCT/US2019/067531, Written Opinion dated May 1, 2020", 6 pgs.
"Taiwanese Application Serial No. 108146582, Office Action dated Sep. 21, 2020", w/ English Translation, 15 pgs.
"Taiwanese Application Serial No. 108146582, Response filed Dec. 18, 2020 to Office Action dated Sep. 21, 2020", w/ English Claims, 38 pgs.
Chin-Hsien, Wu, "A Space-Efficient Caching Mechanism for Flash-Memory Address Translation", Proceedings of the Ninth IEEE International Symposium on Object and Component-Oriented Real-Time Distributed Computing, (2006), 8 pgs.
Wookhan, Jeong, et al., "Improving Flash Storage Performance by Caching Address Mapping Table in Host Memory", Samsung Electronics Co., Ltd, Retrieved from the Internet: URL:https://www.usenix.org/system/files/conference/hotstorage17/hotstorage17-paper-jeong.pdf [retrieved on Nov. 2, 2020], (Jul. 2017), 6 pgs.
Y, Qin, et al., "A Property-Based Attestation Scheme wth the Variable Privacy", IEEE 10th International Conference on Trust, Security and Privacy in Computing and Communications, Changsha, (2011), 1616-1623.
U.S. Appl. No. 17/679,018, filed Feb. 23, 2022, Host-Resident Translation Layer Validity Check.
U.S. Appl. No. 17/576,466, filed Jan. 14, 2022, Host-Resident Translation Layer Validity Check Techniques.
"Chinese Application Serial No. 201980059061.6, Office Action dated May 20, 2022", W/English Translation, 12 pgs.
"Chinese Application Serial No. 201980083546.9, Office Action dated Mar. 24, 2022", w/English translation, 19 pgs.
"Chinese Application Serial No. 201980083546.9, Voluntary Amendment filed Jan. 13, 2022", w/English Claims, 16 pgs.
"Japanese Application Serial No. 2021-535543, Voluntary Amendment Filed Apr. 4, 2022", w/English Translation, 3 pgs.
"Korean Application Serial No. 10-2021-7008127, Response filed Mar. 18, 2022 to Notice of Preliminary Rejection dated Dec. 21, 2021", w/English Claims, 12 pgs.
"Taiwanese Application Serial No. 110126065, Office Action dated Apr. 8, 2022", w/ English Translation, 8 pgs.
"Chinese Application Serial No. 201980059061.6, Response filed Sep. 30, 2022 to Office Action dated May 20, 2022", with English claims, 22 pages.
"Chinese Application Serial No. 201980062579.5, Office Action dated Aug. 2, 2021", with English translation, 9 pages.
"Chinese Application Serial No. 201980083546.9, Decision of Rejection dated Jan. 6, 2023", with machine English translation, 17 pages.
"Chinese Application Serial No. 201980083546.9, Office Action dated Sep. 8, 2022", with English translation, 19 pages.
"Chinese Application Serial No. 201980083546.9, Response filed Aug. 8, 2022 to Office Action dated Mar. 24, 2022", with English claims, 10 pages.
"Chinese Application Serial No. 201980083546.9, Response filed Nov. 23, 2022 to Office Action dated Sep. 8, 2022", with English claims, 9 pages.
"European Application Serial No. 19898012.0, Extended European Search Report dated Aug. 19, 2022", 10 pgs.
"Japanese Application Serial No. 2021-535543, Notification of Reasons for Rejection dated Aug. 23, 2022", with English translation, 19 pages.
"Korean Application Serial No. 10-2022-7029363, Notice of Preliminary Rejection dated Dec. 14, 2022", with English machine translation, 13 pgs.
"Taiwanese Application Serial No. 110126065, Office Action dated Nov. 28, 2022", with machine English translation, 25 pages.
"Taiwanese Application Serial No. 110126065, Response filed Jul. 18, 2022 to Office Action dated Apr. 8, 2022", with English claims, 44 pages.
"Japanese Application Serial No. 2021-535543, Examiners Decision of Final Refusal dated Apr. 18, 2023", with English translation, 2 pages.
"Korean Application Serial No. 10-2022-7008946, Notice of Preliminary Rejection dated Aug. 22, 2023", with English translation, 12 pages.

\* cited by examiner

HOST-BASED FLASH MEMORY MAINTENANCE TECHNIQUES

PRIORITY APPLICATION

This application is a continuation of U.S. application Ser. No. 16/230,313, filed Dec. 21, 2018, which is incorporated herein by reference in its entirety.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc.

A memory system can include one or more processors or other memory controllers performing logic functions to operate the memory devices or interface with external systems. The memory matrices or arrays can include a number of blocks of memory cells organized into a number of physical pages. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
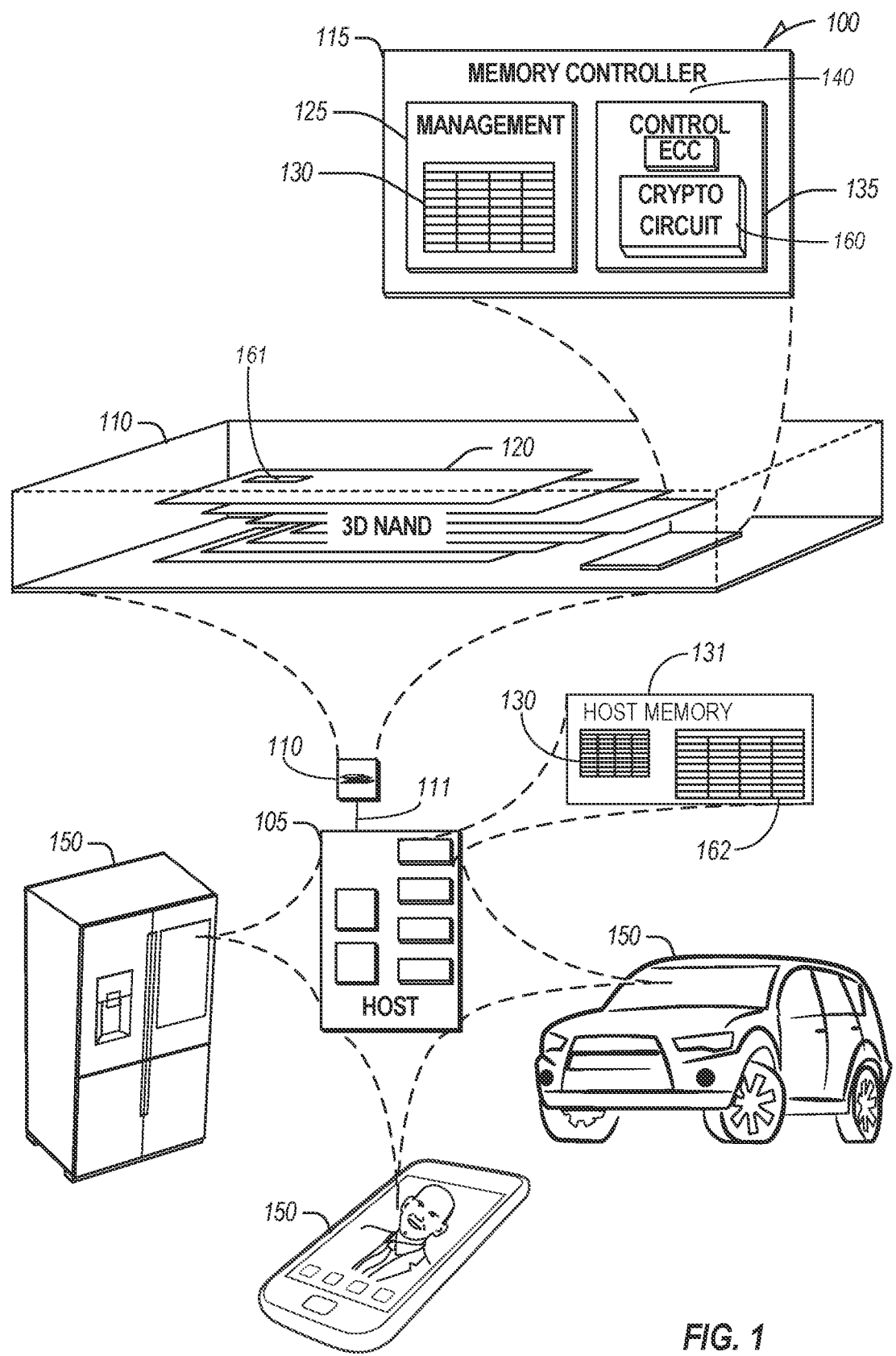
FIG. 1 illustrates an example system an environment including a memory device upon which one or more examples of the present subject matter may be implemented.

Flash memory based storage devices such as NAND memory can use a Flash Translation Layer (FTL) to translate logical addresses of I/O requests, often referred to as logical block addresses (LBAs), to corresponding flash memory addresses which are stored in one or more FTL mapping tables. LBAs can be the logical addresses used by a host for managing data. Mobile storage devices typically have a cache with constrained size, and thus often lack memory to store an entire mapping table. Therefore, portions of the mapping table(s) can be retrieved from the flash memory on demand, which can cause random read performance degradation.

In order to improve random read performance, techniques described herein enable use of host-resident memory, in addition to memory cells of a memory device coupled to the host, as a cache for a FTL mapping table. Under a host-resident FTL, FTL data can be read from host memory faster than from flash memory, and the host can initiate a memory operation by retrieving a physical address (PA) of the flash memory and including the PA in a memory request to the flash memory. The PA can be retrieved by the host using the FTL memory cache of the host and the LBA of the host. Upon receiving the memory request, a flash memory system, such as an flash memory device or system external to the host, can immediately retrieve the data associated with the physical address without the delay associated with accessing the flash memory-based mapping table and using the LBA to obtain the physical address.

In certain implementations of a host-resident FTL, improvements in random read workload performance can be significant. However, the present inventors have identified techniques for host-resident FTL that can assist in validating the integrity of host memory requests, can assist in maintaining coherency between the host FTL table and the actual flash mapping table, and can assist in providing timely updates to the host FTL table while host-triggered memory operations are at or near idle. Straightforward implementations of host-resident FTL can assume that the mapping table remains accurate between host initiated operations. However, the memory system or memory device connected to the host often performs housekeeping operations or procedures such a garbage collection procedures and wear leveling procedures in between host initiated operations or during times when the host is idle. Housekeeping operations move data around and often revise and update, the mapping table resident at the memory device. Without some validity checks, straight forward implementation of host-resident FTL, such as a memory system blindly using the host-provided PA to access flash data, can often result in the memory system accessing flash memory at the wrong PA.

In addition, the present inventors have also recognized that off-loading memory maintenance of a flash memory device or flash memory system to the host can allow for simpler flash memory devices that include simpler firmware, simpler hardware, simpler validation or combinations thereof, and thus lower cost and better time to market than conventional flash memory devices such as conventional managed-NAND flash memory devices.

FIG. 1 illustrates an example of an environment 100 including a host 105 and a memory device 110 configured to communicate over a communication interface. The host 105 or the memory device 110 may be included in a variety of products 150, such as IoT devices (e.g., a refrigerator or other appliance, sensor, motor or actuator, mobile communication device, automobile, mobile phone, drone, etc.) to support processing, communications, or control of the product 150.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor). In an example, the memory device 110 can be a discrete memory device. In certain examples, one or more memory die of the memory array 120 can include a first complete FTL table 161 for mapping logical block addresses of the host with physical addresses of the flash memory.

One or more communication interfaces 111 can be used to transfer data between the memory device 110 and one or more other components of the host 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host 105 can include a host system, an electronic device, a processor, a memory card reader, or one or more other electronic devices external to the memory device 110. In some examples, the host 105 may be a machine having some portion, or all, of the components discussed in reference to the machine 700 of FIG. 7. Data may be transferred between the memory device 110 and other components over an input/output (I/O) bus that may include one or more latches for temporarily storing the data as it is being transferred (e.g., before being read or written from/to a memory array).

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits (and corresponding latches), caches, lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of memory controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. Array controller 135 may transmit detected BER information to memory manager 125 for storage and tracking. The memory controller 115 may include a command queue (not shown) that tracks memory commands received from a host. Commands in the queue may be executed by memory controller 115 in a first-in first-out (FIFO) manner, stack manner, out of sequence, according to priority, or in any other suitable order.

The described memory device 110 includes cryptography circuitry 160 in association with the memory array 120. In certain examples, the cryptography circuitry 160 can include an encryption circuit, a decryption circuit, or a combination thereof. In some implementations, memory controller 115 of memory device 110 may include control circuitry configured to implement the functions of the cryptography circuit 160. In other implementations, the cryptography circuit 160 may include an independent control circuitry for implementing the described functionality. In yet other implementations, control circuitry may be divided between the cryptography circuit 160 and memory controller 115 to implement the described functions of the cryptography circuit 160. In the depicted example, the array controller 135 forms a portion of the memory controller 115, and the cryptography circuit 160 forms a portion of the array controller. In other implementations, cryptography circuit 160 may be external, and/or outside of array controller 135. For example, the cryptography circuit 160 (or any individual components thereof), may be an independent component coupled to one or more components in environment 100. However physically located, the structures providing the additional functionality of the cryptography circuit 160, function to verify physical addresses provided by the host 105 to prevent erroneous or malicious access to the memory device and to provide opportunities for the host to refresh the host-resident mapping table information to align the mapping information with the mapping information of the memory device during host-resident FTL operation of the environment 100.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding single-level cell (SLC) NAND flash device. As such, the MLC device may require more metadata bytes for error data than the corresponding SLC device.

In certain examples, the host can include second memory 111. The second memory 111 is not a flash-type memory device. In certain examples, the second memory 111 can be used to store and maintain a set of management tables 130. The management tables can include various information associated with one or more components of the memory device 110 (e.g., various information associated with a memory array or one or more memory cells coupled to the memory controller 115 and can include an FTL table). For example, the management tables 130 can include information regarding FTL mapping information, block age, block erase count, error history, error parameter information, host reset timeout value, memory operation command latencies, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things.

In certain examples, the second memory can include a second complete FTL table 162 for mapping logical block addresses of the host with physical addresses of the flash memory. In some examples, the environment 100 may include only one of the first complete FTL table 162, or the second complete FTL table 162.

Figure 2:
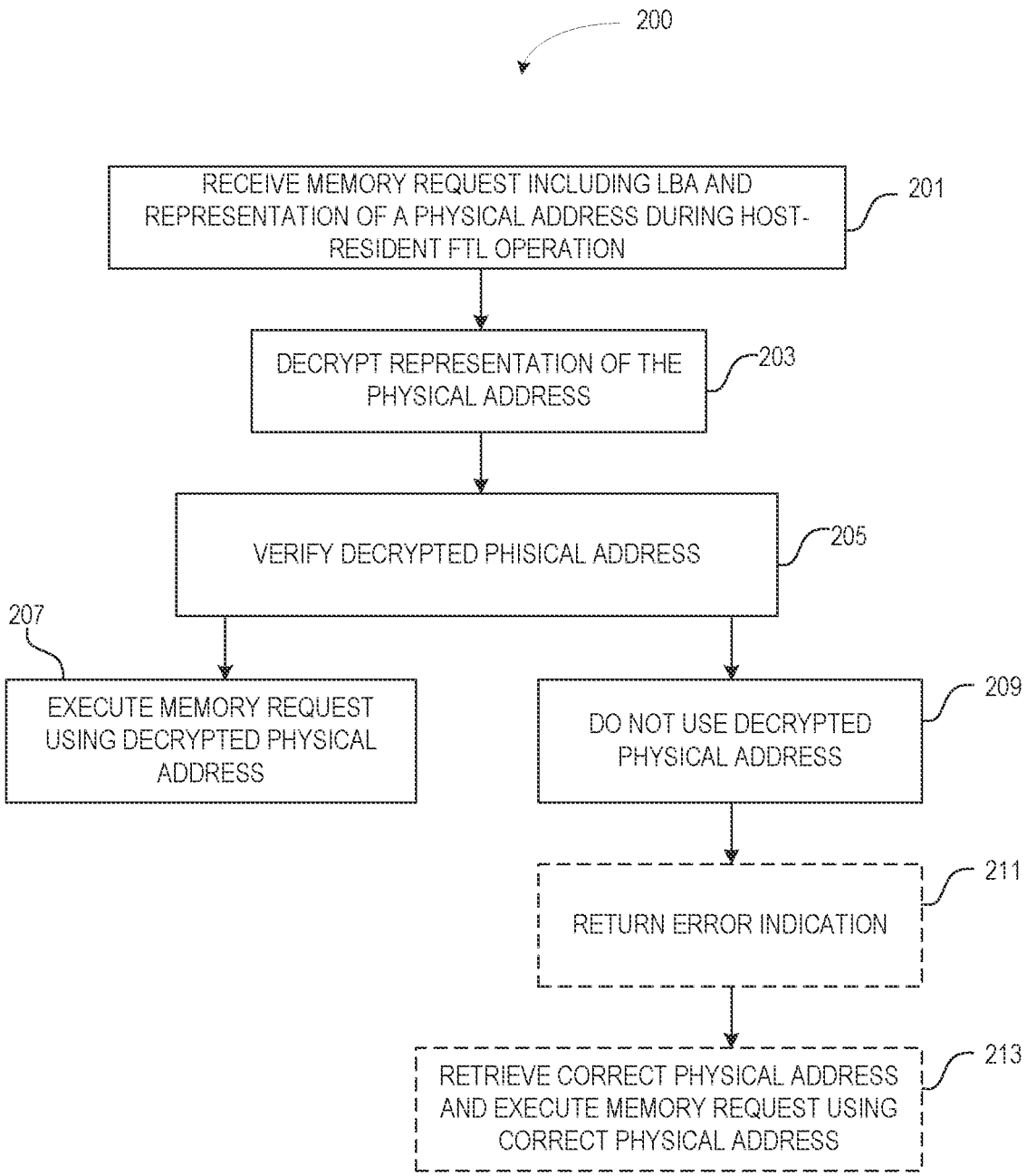
FIG. 2 illustrates generally a flowchart of an example method for implementing memory operations at a flash memory system using aspects of host-resident FTL.

FIG. 2 illustrates generally a flowchart of an example method 200 for implementing memory operations at a flash memory system using aspects of host-resident FTL. In certain examples, the method can assist in validating that the physical address received from the host corresponds to the LBA provided by the host. Without some form of verification, a malicious host can provide an LBA and an unrelated physical address that may result in accessing flash memory data not intended to be accessible by the host, or not intended to be accessed by the host using the particular host memory request received at the memory system. At 201, the memory system can receive a host memory request including an LBA and a representation of a physical address during a host-resident FTL mode of operation. The LBA represents a memory location within the memory system of the host. The physical address represents a memory location within the flash memory of the flash memory system. Outside of the host-resident FTL mode of operation, the memory controller of the flash memory system can located the physical address mapped to the received LBA using mapping information within a cache of the memory controller or using a full mapping table stored on flash memory of the flash memory system. During a host-resident FTL mode of operation, the host can provide the mapped physical address, or a representation thereof, associated with the LBA. In certain situations, providing the mapped physical address can reduce the frequency that the memory controller retrieves memory information from the flash memory of the flash memory system. Accessing flash memory to retrieve memory mapping information can significantly reduce performance of memory operation of the host, therefore, reducing the frequency that the memory controller retrieves memory mapping information can significantly enhance performance of memory requests of the host.

To prevent unintended or malicious access to restricted areas of flash memory of the memory system, at 203, the representation of the physical address can be decrypted using a key of the flash memory system. In certain examples, the flash memory system can include a cryptography circuit. In certain examples, the cryptography circuit can be part of the memory controller. The cryptography circuit may be implemented in hardware, firmware, software, or a combination thereof.

At 205, the decrypted physical address can be verified as a valid physical address of the flash memory system for the memory request. In certain examples, verification can include locating the LBA in a cache of the memory controller and comparing the decrypted physical address with the physical address mapped to the LBA. Whether the LBA is located within the cache of the memory controller, the memory controller can compare the decrypted physical address with a table including address regions that are not restricted for the memory request and verifying the decrypted physical address falls within one of the address regions.

At 207, when the memory controller has verified the decrypted physical address is a valid physical address for the memory request, the memory controller can execute the memory request using the decrypted physical address. When the memory controller fails to verify the decrypted physical address is a valid physical address for the memory request, the memory controller does not execute the memory request using the decrypted physical address.

At 209, when the memory controller fails to verify the decrypted physical address is a valid physical address for the memory request, the memory controller does not use the decrypted physical address to execute the memory request. At 211, the memory controller can optionally return an error indication to the host. At 213, when the memory controller fails to verify the decrypted physical address is a valid physical address for the memory request, the memory controller can optionally retrieve a correct physical address associated with the LBA using the mapping information stored and maintained in either the cache or the flash memory of the flash memory system and then, at 213, execute the memory request using the correct physical address. In certain examples, the LBA may be verified as a valid LBA at the memory system. Such verification can include comparing the received LBA to entries of a table of valid LBAs. If the received LBA does not match an entry of the table of valid LBAs, the memory controller can ignore the memory request, return an error indication, or combination thereof.

Figure 3:
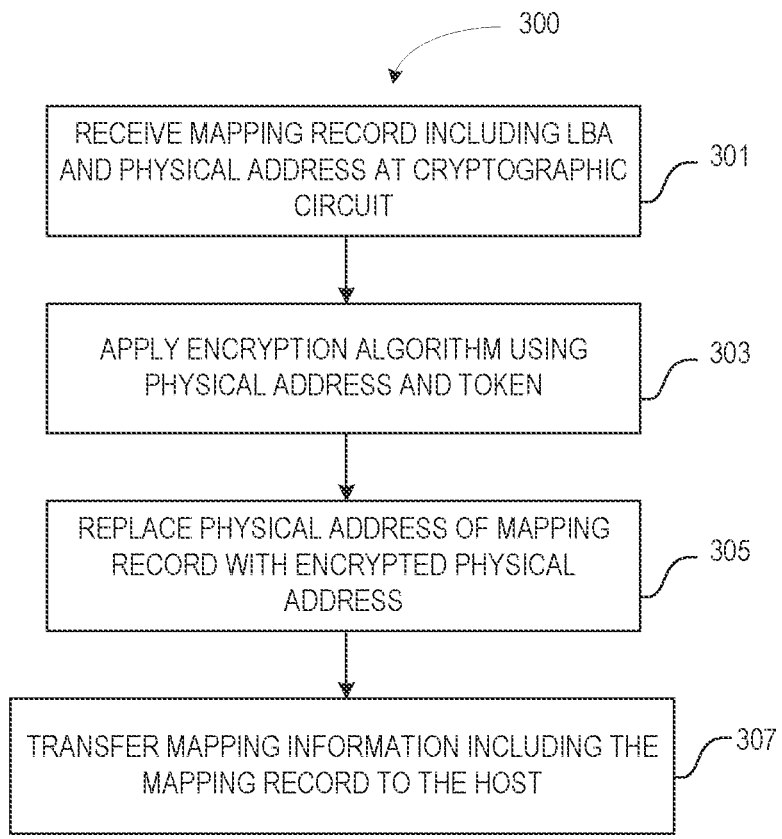
FIG. 3 illustrates generally a flowchart of an example method for efficiently monitoring and updating host mapping table data for host-resident FTL operation.

In certain examples, the mapping information provided to the host for use during a host-resident FTL mode of operation is provided by the memory device. Prior to providing the mapping information to the host, the memory controller of the flash memory system can encrypt the physical address and provided an encrypted representation of each physical address of instead of the actual physical address. FIG. 3 illustrates generally a flowchart of an example method 300 for providing mapping information to the host from a flash memory system. The memory controller can generate mapping information as memory requests are received from the host. The mapping information can be quite large such that it is stored on flash memory along with stored data. In certain examples, the mapping information can be stored in a table with records in the table including a LBA associated with a memory location of the host and a physical address associated with a memory location of the flash memory system mapped to the LBA. At 301, the memory controller, or a cryptographic circuit of the memory controller, can receive a mapping table record. The mapping table record can include an LBA and a physical address of the flash memory system mapped to the LBA. IN certain examples, the memory controller maps the each LBA of the host with a corresponding physical address of the flash memory system as the host makes memory requests of the flash memory system.

At 301, the cryptographic circuit can receive mapping information, such as a mapping record of a mapping table that includes an LBA of a host and a physical address of the flash memory system mapped to the LBA. The cryptographic circuit can be part of the flash memory system. In some examples, the cryptographic circuit can be part of a memory controller of the flash memory system. At 303, the cryptographic circuit can apply an encryption algorithm to the physical address using a token. In certain examples, the token can be hardcoded in non-volatile memory of the flash memory system. Application of the encryption algorithm generates an encrypted version of the physical address. At 305, the physical address of the mapping record can be replaced with the encrypted version of the physical address. In certain examples the encrypted physical address can include a secret. In certain examples, the host can use the secret to maintain statistics about the flash memory system. Such memory statistics can include, but are not limited to, program count, erase count, program/erase cycle count, cycle count, invalid page count, expected wear value, or combinations thereof. At 307, mapping information can be transferred to the host for use during a host-resident FTL mode of operation of an environment (e.g., 100). The mapping information can include mapping records that include an LBA and a corresponding encrypted version of the physical addressed corresponding to the LBA.

Figure 4:
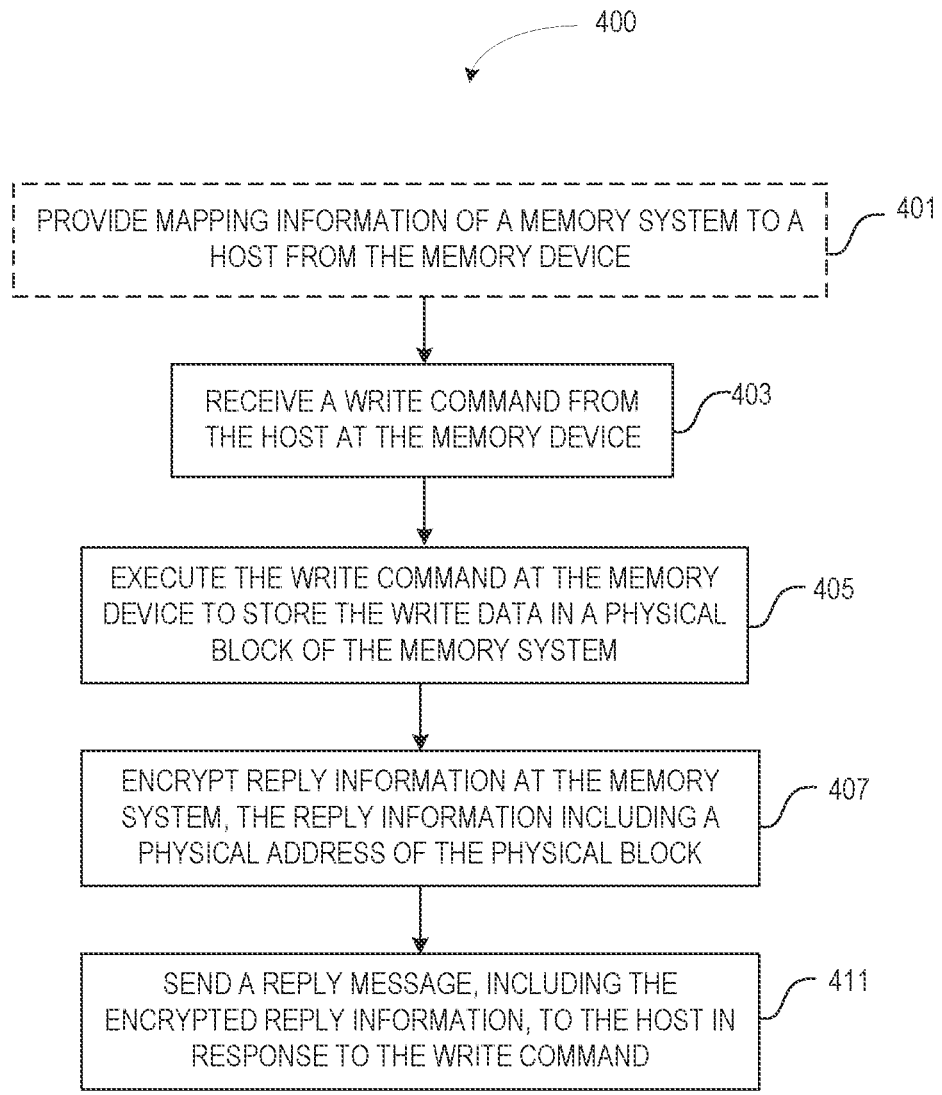
FIG. 4 illustrates generally a flowchart of an example method for maintaining flash memory maintenance information of the memory system at the host.

FIG. 4 illustrates generally a flowchart of an example method 400 for maintaining flash memory maintenance information of the memory system at the host. At 401, the memory system can optionally provide mapping information to the host. The mapping information can be provided in response to various memory requests received at the memory system and can allow the host to have a complete map of the memory system including the flash memory. At 403, the memory system can receive a write command from the host. The write command can include a logical block address. In examples where the host operates in an FTL mode of operation, the write command can include a representation of a physical address or physical block of the flash memory at which to store the write data associated with the write command.

At 405, the memory system can store the write data in a physical block of the flash memory. In some examples, the physical block can be the same physical block supplied by the host with the write command. At 407, the memory system can encrypt reply information about the execution of the write command. In certain examples the reply information can include an indication of the physical block at which the write data was stored. In some examples, the reply information can include a recognizable secret to allow the host to extract the physical block information for purposes of maintain maintenance statistics of the flash memory. At 411, the reply information can be sent to the host in response to the write command via a reply message.

Figure 5:
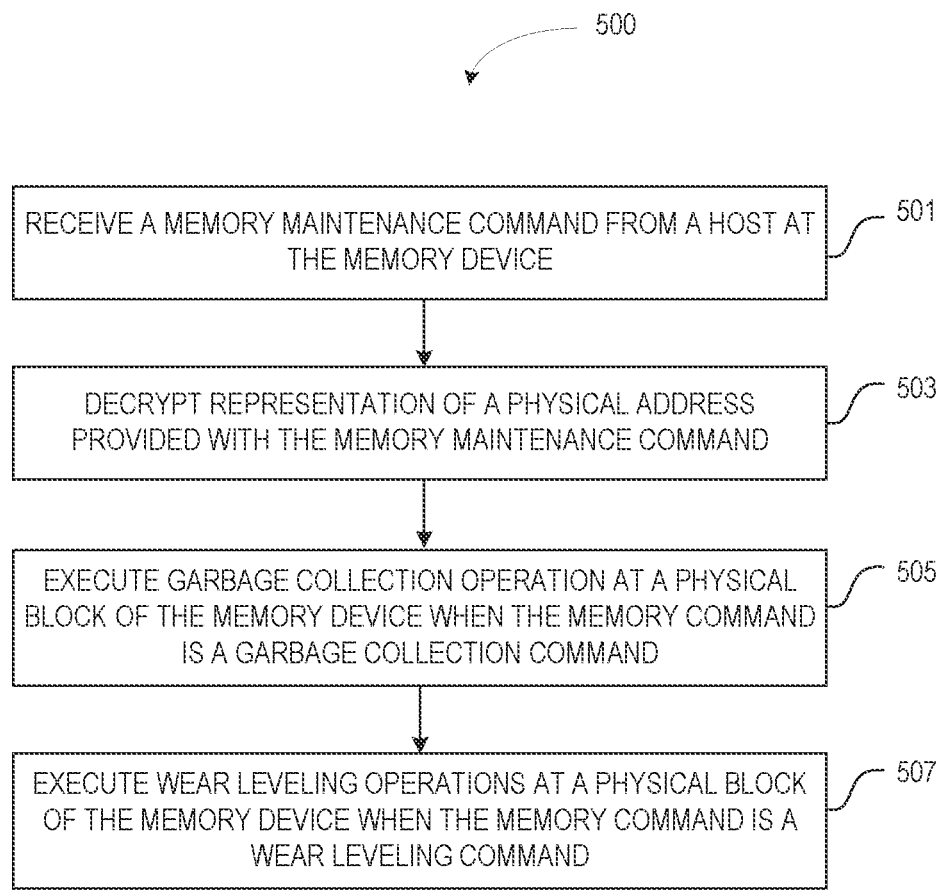
FIG. 5 illustrates generally a flowchart of an example method for receiving a maintenance command from a host at a memory device.

FIG. 5 illustrates generally a flowchart of an example method 500 for receiving a memory maintenance command from a host at a memory device. At 501, the memory device can receive a maintenance command from the host. The maintenance command can include a representation of an address of a flash memory block of the memory device. In certain examples, the representation of the memory block can be encrypted and a controller of the memory device can decrypt the memory block address. In certain examples, the memory device can maintain rudimentary maintenance statistics and can treat the maintenance command as a hint, especially in cases where the host does not operate in an FTL mode of operation. When the maintenance command is treated as a hint, the memory device can compare the rudimentary statistics to a threshold to determine whether to execute the commanded maintenance. In certain examples, the memory device can optionally provide reply information to the host, via a rely message, indicating whether the maintenance was performed or not.

At 505, the memory device can execute garbage collection at the memory block when the maintenance command is a garbage collection command. At 507, the memory device can execute wear-leveling operations at the memory block when the maintenance command is a wear-leveling command. At 511, as discussed above, the memory device can optionally provide reply to the host in response to the maintenance command via a reply message.

Figure 6:
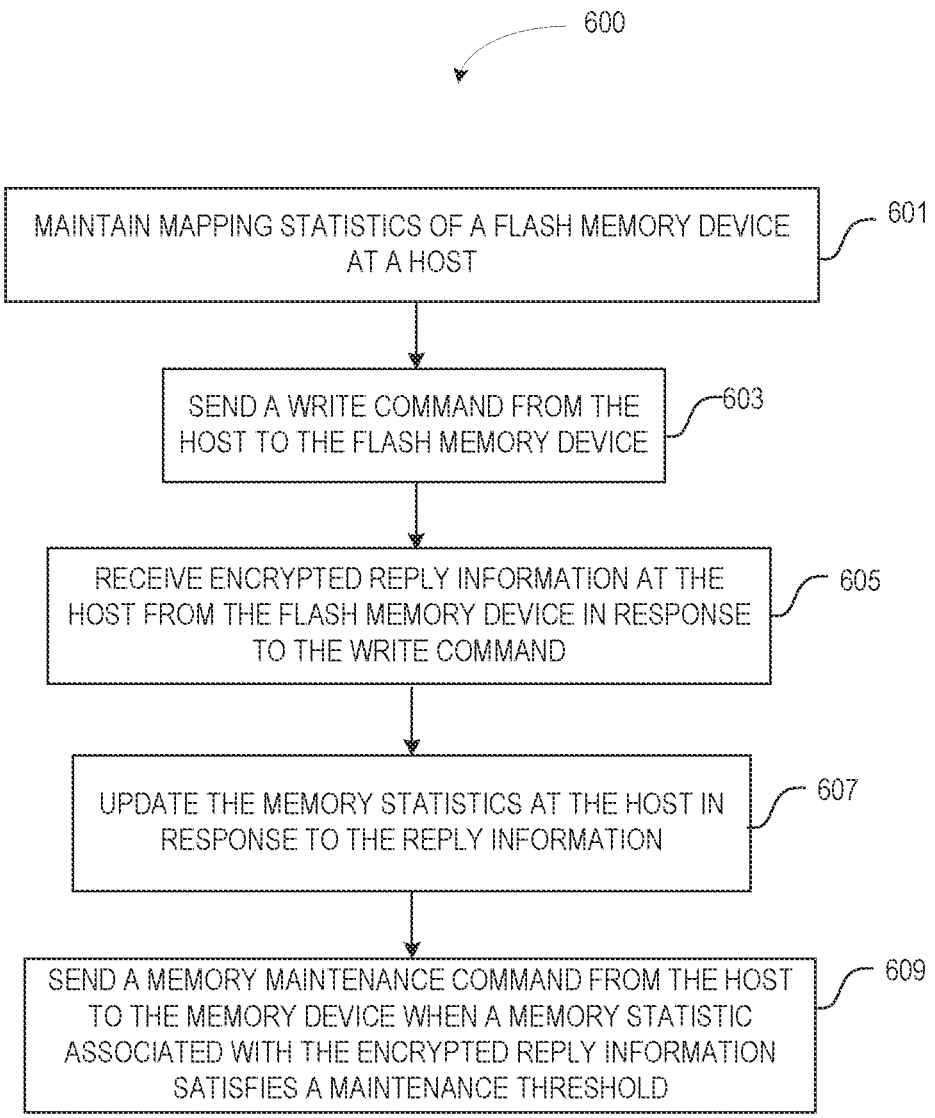
FIG. 6 illustrates generally a flowchart of an example method for using a host to maintain a flash memory device.

FIG. 6 illustrates generally a flowchart of an example method 500 for using a host to maintain a flash memory device. At 601, the host can initiate or maintain statistics about a flash memory device the host uses to store information. In certain examples, the statistics can include, but are not limited to, FTL mapping information, block age, block erase count, error history, error parameter information, host reset timeout value, memory operation command latencies, or one or more error counts (e.g., a write operation error count, a read bit error count, a read operation error count, an erase error count, etc.) for one or more blocks of memory cells of the flash memory device. At 603, the host can send a write command and associated write data to the flash memory device. At 605, the host can receive encrypted reply information associated with, or in response to, the write command. The encrypted reply information can include information about the block of flash memory where the write data is stored. In certain examples, the encrypted reply information can include a secret the host can recognize, and the secret can be used to decrypt at least a portion of the encrypted reply information such as the information about the block of flash memory where the write data is stored.

At 607, the host can update the statistics about the flash memory device using the information about the block of flash memory where the write data is stored provided with the encrypted reply information. In certain examples, the host can compare one or more of the statistics to maintenance threshold values and, at 609, can send a maintenance command to the memory device. In certain examples, the maintenance command can include, but is not limited to, a garbage collection command or a wear-leveling command. The maintenance command can include an address of a target block of the flash memory of the flash memory device. In certain examples, the address of the target block can be encrypted such that the true actual block can only be decrypted by the flash memory device. In certain examples, the statistics about the flash memory device kept by the host are very course statistics and when the host send a maintenance command to the memory device, the memory device treats the command as a suggestion and may not execute the maintenance command if finer-grain statistics kept at the memory device, compared to the statistics kept by the host, satisfy a maintenance threshold of the flash memory device. In certain examples, the memory device can optionally provide reply information to the host, via a rely message, indicating whether the maintenance was performed or not.

Figure 7:
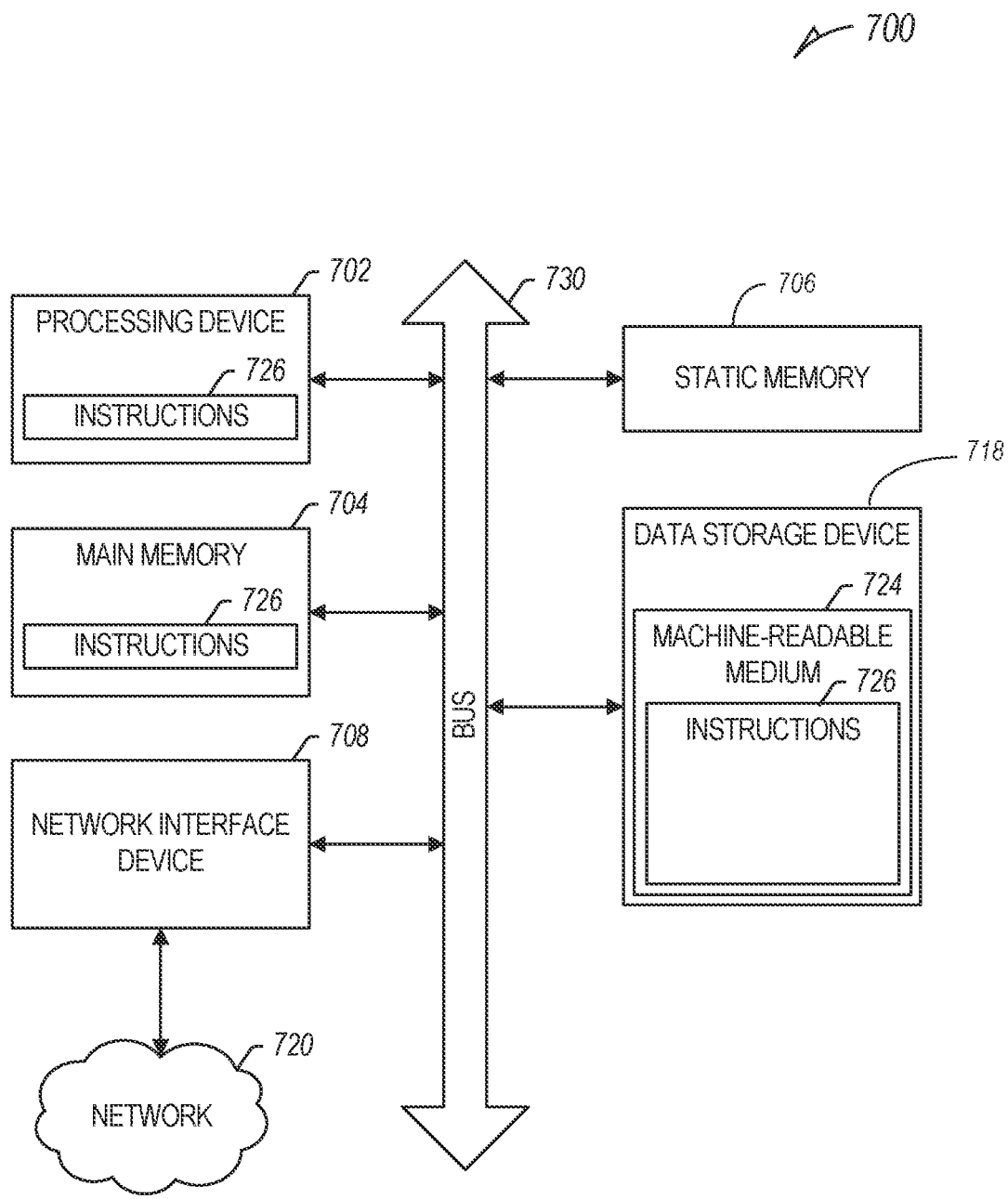
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 (e.g., the host 105, the memory device 110, etc.) may include a processing device 702 (e.g., a hardware processor, a central processing unit (CPU), a graphics processing unit (GPU), a hardware processor core, or any combination thereof, such as a memory controller of the memory device 110, etc.), a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random-access memory (SRAM), etc.), and a data storage system 718, some or all of which may communicate with each other via an interlink (e.g., bus) 730.

The processing device 702 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 can be configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 or within the processing device 702 during execution thereof by the computer system 700, the main memory 704 and the processing device 702 also constituting machine-readable storage media. The machine-readable storage medium 724, the data storage system 718, or the main memory 704 can correspond to the memory device 110 of FIG. 1.

In one implementation, the instructions 726 include instructions to implement functionality corresponding to one or more host-resident FTL operations discussed above with respect to FIG. 2 or FIG. 3. While the machine-readable storage medium 724 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 700 may further include a display unit, an alphanumeric input device (e.g., a keyboard), and a user interface (UI) navigation device (e.g., a mouse). In an example, one or more of the display unit, the input device, or the UI navigation device may be a touch screen display.

The machine a signal generation device (e.g., a speaker), or one or more sensors, such as a global positioning system (GPS) sensor, compass, accelerometer, or one or more other sensor. The machine 700 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 726 (e.g., software, programs, an operating system (OS), etc.) or other data are stored on the data storage device 718 can be accessed by the main memory 704 for use by the processing device 702. The main memory 704 (e.g., DRAM) is typically fast, but volatile, and thus a different type of storage than the data storage device 718 (e.g., an SSD), which is suitable for long-term storage, including while in an "off" condition. The instructions 726 or data in use by a user or the machine 700 are typically loaded in the main memory 704 for use by the processing device 702. When the main memory 704 is full, virtual space from the data storage device 718 can be allocated to supplement the main memory 704; however, because the data storage device 718 device is typically slower than the main memory 704, and write speeds are typically at least twice as slow as read speeds, use of virtual memory can greatly reduce user experience due to storage device latency (in contrast to the main memory 704, e.g., DRAM). Further, use of the data storage device 718 for virtual memory can greatly reduce the usable lifespan of the data storage device 718.

In contrast to virtual memory, virtual memory compression (e.g., the Linux™ kernel feature "ZRAM") uses part of the memory as compressed block storage to avoid paging to the data storage device 718. Paging takes place in the compressed block until it is necessary to write such data to the data storage device 718. Virtual memory compression increases the usable size of the main memory 704, while reducing wear on the data storage device 718.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 724 may further be transmitted or received over a network 720 using a transmission medium via the network interface device 708 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi*, IEEE 802.16 family of standards known as WiMax®), IEEE 802.15.4 family of standards, peer-to-peer (P2P) networks, among others. In an example, the network interface device 708 may include one or more physical jacks (e.g., Ethernet, coaxial, or phone jacks) or one or more antennas to connect to the network 720. In an example, the network interface device 708 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

ADDITIONAL NOTES AND EXAMPLES

Example 1 is a method comprising: providing mapping table information to a host from a memory device; receiving a write command and write data from the host at the memory device; executing the write command at the memory device to store the write data in a physical block of the memory device; and encrypting reply information at the memory device, the reply information including a physical address of the physical block; and sending a reply message, including the encrypted reply information, to the host in response to the write command.

In Example 2, the subject matter of Example 1, including receiving a memory maintenance command from the host at the memory device, wherein the memory maintenance command includes at least a portion of the encrypted reply information.

In Example 3, the subject matter of Example 2, including decrypting the encrypted reply information at the memory device to provide the physical address.

In Example 4, the subject matter of Example 3, wherein the memory maintenance command is a garbage collection command.

In Example 5, the subject matter of Example 4, wherein the method includes executing garbage collection at a physical block of memory of the memory device represented by the physical address.

In Example 6, the subject matter of any of Examples 4-5, determining the physical address is not a valid physical address of the memory device; and not executing a garbage collection procedure in response to the garbage collection command.

In Example 7, the subject matter of any of Examples 3-6, wherein the memory maintenance command is a wear-leveling command.

In Example 8, the subject matter of Example 7, including executing a wear-leveling procedure at a physical block of memory of the memory device represented by the physical address.

In Example 9, the subject matter of any of Examples 7-8, including determining the physical address is not a valid physical address of the memory device; and not executing a wear-leveling procedure in reply to the wear-leveling command.

In Example 10, the subject matter of any of Examples 1-9, wherein the reply information includes a secret; and wherein decrypting the reply information includes decrypting the reply information using the secret.

In Example 11, the subject matter of any of Examples 1-10, wherein the physical block includes flash memory.

In Example 12, the subject matter of Example 11, wherein the flash memory includes NAND memory.

Example 13 is a method comprising: maintaining mapping table information and memory statistics of an external flash memory system at a host; sending a write command and write data to the external flash memory system from the host; receiving encrypted reply information from the external flash memory system in response to the write command; updating the memory statistics of the external flash memory system at the host using the encrypted reply information; and sending a memory maintenance command when a memory statistic associated with the encrypted reply information satisfies a maintenance threshold; and wherein the memory maintenance command includes the encrypted reply information.

In Example 14, the subject matter of Example 13, wherein the encrypted reply information includes a secret.

In Example 15, the subject matter of Example 14, wherein maintaining memory statistics of the external flash memory system includes decrypting the encrypted reply information using the secret to provide a physical address of the external flash memory system.

In Example 16, the subject matter of Example 15, wherein maintaining memory statistics of the external flash memory system includes updating the mapping table information using the physical address.

In Example 17, the subject matter of any of Examples 15-16, wherein maintaining memory statistics of the external flash memory system includes maintain a valid data count statistic using the physical address.

In Example 18, the subject matter of any of Examples 15-17, wherein maintaining memory statistics of the external flash memory system includes maintaining a full/empty status statistic using the physical address.

In Example 19, the subject matter of any of Examples 15-18, wherein maintaining memory statistics of the external flash memory system includes maintaining a time since last write statistic using the physical address.

In Example 20, the subject matter of any of Examples 13-19, wherein the memory maintenance command is a garbage collection command.

In Example 21, the subject matter of any of Examples 13-20, wherein the memory maintenance command is a wear-leveling command.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. Unless otherwise clearly indicated by express language or context, MLC is used herein in its broader context, to refer to memory cells that can store more than one bit of data per cell (i.e., that can represent more than two programmed states).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method comprising:
providing mapping table information to a host from a NAND memory device, the mapping table information including physical addresses that are encrypted with a cryptographic key of the NAND memory device;
receiving a memory command from the host at the NAND memory device, the memory command including an encrypted physical address;
decrypting the encrypted physical address with the cryptographic key to produce a decrypted physical address;

validating the decrypted physical address;
responsive to validating the decrypted physical address, executing the memory command at the NAND memory device on NAND memory of the NAND memory device corresponding to the decrypted physical address;
sending a reply message to the host in response to the memory command;
receiving a maintenance command from the host, the host sending the maintenance command responsive to coarse statistics of the NAND memory device kept on the host indicating that the memory device satisfies a maintenance threshold;
determining that statistics kept at the NAND memory device do not satisfy the maintenance threshold; and
in response to determining that statistics kept at the NAND memory device do not satisfy the maintenance threshold:
 not performing the maintenance; and
 providing a reply to the host that the maintenance was not performed.

2. The method of claim 1, wherein the maintenance command is a garbage collection command.

3. The method of claim 1, wherein the maintenance command is a wear levelling command.

4. The method of claim 1, further comprising:
receiving a write command along with write data from the host;
execute the write command at the NAND memory device to store the write data at a physical location referenced by a second physical address of the NAND memory device;
encrypting reply information, the reply information including the second physical address; and
sending the encrypted reply information to the host.

5. The method of claim 1, wherein the memory command includes a logical block address and wherein validating the decrypted physical address comprises verifying that a physical address associated with the logical block address that is stored in a logical to physical mapping table on the NAND memory device matches the decrypted physical address.

6. The method of claim 1, further comprising:
receiving a second memory command from the host at the NAND memory device, the second memory command including a second encrypted physical address;
decrypting the second encrypted physical address with the cryptographic key to produce a decrypted physical address;
determining that the second encrypted physical address was not decrypted successfully; and
responsive to determining that the second encrypted physical address was not decrypted successfully, refraining from executing the second memory command.

7. The method of claim 1, further comprising:
receiving a second memory command from the host at the NAND memory device, the second memory command including a second encrypted physical address and a logical block address;
decrypting the second encrypted physical address with the cryptographic key to produce a decrypted physical address;
unsuccessfully validating the second decrypted physical address;
responsive to unsuccessfully validating the decrypted physical address, determining a correct physical address by utilizing a logical-to-physical mapping table and executing the memory command at the NAND memory device on NAND memory of the NAND memory device corresponding to the correct physical address; and
sending a second reply message to the host in response to the memory command.

8. The method of claim 7, wherein the second reply message includes an encrypted copy of the correct physical address.

9. A NAND memory device comprising:
a controller, configured to perform operations comprising:
providing mapping table information to a host from the NAND memory device, the mapping table information including physical addresses that are encrypted with a cryptographic key of the NAND memory device;
receiving a memory command from the host at the NAND memory device, the memory command including an encrypted physical address;
decrypting the encrypted physical address with the cryptographic key to produce a decrypted physical address;
validating the decrypted physical address;
responsive to validating the decrypted physical address, executing the memory command at the NAND memory device on NAND memory of the NAND memory device corresponding to the decrypted physical address; and
sending a reply message to the host in response to the memory command;
receiving a maintenance command from the host, the host sending the maintenance command responsive to coarse statistics of the NAND memory device kept on the host indicating that the memory device satisfies a maintenance threshold;
determining that statistics kept at the NAND memory device do not satisfy the maintenance threshold; and
in response to determining that statistics kept at the NAND memory device do not satisfy the maintenance threshold:
 not performing the maintenance; and
providing a reply to the host that the maintenance was not performed.

10. The memory device of claim 9, wherein the memory maintenance command is a garbage collection command.

11. The memory device of claim 9, wherein the memory maintenance command is a wear levelling command.

12. The memory device of claim 9, wherein the operations further comprise:
receiving a write command along with write data from the host;
execute the write command at the NAND memory device to store the write data at a physical location referenced by a second physical address of the NAND memory device;
encrypting reply information, the reply information including the second physical address; and
sending the encrypted reply information to the host.

13. The memory device of claim 9, wherein the memory command includes a logical block address and wherein the operations of validating the decrypted physical address comprises verifying that a physical address associated with the logical block address that is stored in a logical to physical mapping table on the NAND memory device matches the decrypted physical address.

14. The memory device of claim 9, wherein the operations further comprise:

receiving a second memory command from the host at the NAND memory device, the second memory command including a second encrypted physical address;
decrypting the second encrypted physical address with the cryptographic key to produce a decrypted physical address;
determining that the second encrypted physical address was not decrypted successfully; and
responsive to determining that the second encrypted physical address was not decrypted successfully, refraining from executing the second memory command.

15. The memory device of claim 9, wherein the operations further comprise:
receiving a second memory command from the host at the NAND memory device, the second memory command including a second encrypted physical address and a logical block address;
decrypting the second encrypted physical address with the cryptographic key to produce a decrypted physical address;
unsuccessfully validating the second decrypted physical address;
responsive to unsuccessfully validating the decrypted physical address, determining a correct physical address by utilizing a logical-to-physical mapping table and executing the memory command at the NAND memory device on NAND memory of the NAND memory device corresponding to the correct physical address; and
sending a second reply message to the host in response to the memory command.

16. The memory device of claim 15, wherein the second reply message includes an encrypted copy of the correct physical address.

17. A non-transitory machine-readable medium, storing instructions, which when executed by a NAND memory device, causes the NAND memory device to perform operations comprising:
providing mapping table information to a host from the NAND memory device, the mapping table information including physical addresses that are encrypted with a cryptographic key of the NAND memory device;
receiving a memory command from the host at the NAND memory device, the memory command including an encrypted physical address;
decrypting the encrypted physical address with the cryptographic key to produce a decrypted physical address;
validating the decrypted physical address;
responsive to validating the decrypted physical address, executing the memory command at the NAND memory device on NAND memory of the NAND memory device corresponding to the decrypted physical address; and
sending a reply message to the host in response to the memory command;
receiving a maintenance command from the host, the host sending the maintenance command responsive to coarse statistics of the NAND memory device kept on the host indicating that the memory device satisfies a maintenance threshold;
determining that statistics kept at the NAND memory device do not satisfy the maintenance threshold; and
in response to determining that statistics kept at the NAND memory device do not satisfy the maintenance threshold:
not performing the maintenance; and
providing a reply to the host that the maintenance was not performed.

18. The non-transitory machine-readable medium of claim 17, wherein the maintenance command is a garbage collection command.

19. The non-transitory machine-readable medium of claim 17, wherein the memory maintenance command is a wear levelling command.

20. The non-transitory machine-readable medium of claim 17, wherein the operations further comprise:
receiving a write command along with write data from the host;
execute the write command at the NAND memory device to store the write data at a physical location referenced by a second physical address of the NAND memory device;
encrypting reply information, the reply information including the second physical address; and
sending the encrypted reply information to the host.

* * * * *